Jan. 30, 1962  C. G. HOWARD  3,019,381
RECTIFIER
Filed May 4, 1955  2 Sheets-Sheet 1
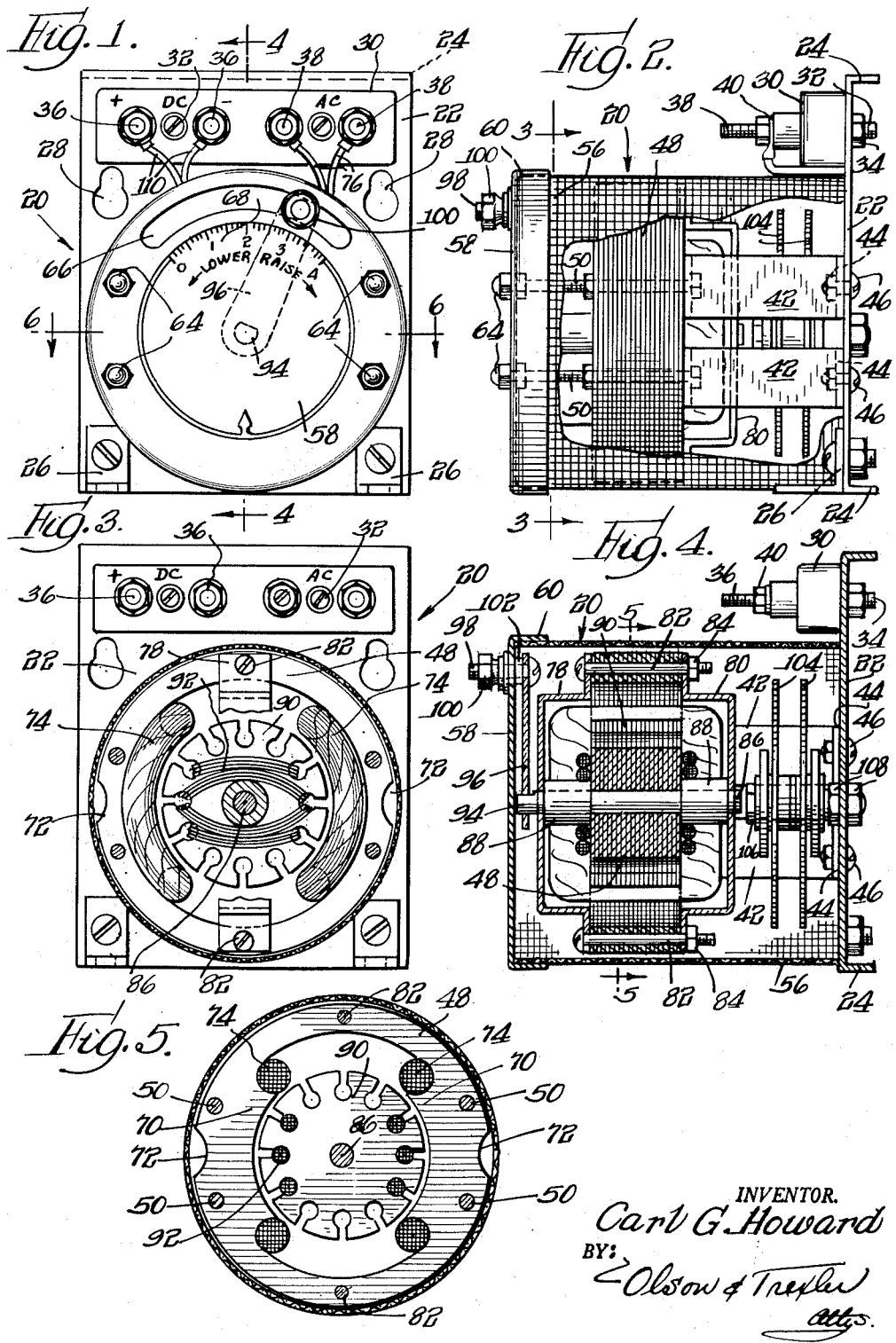
INVENTOR.
Carl G. Howard
BY:
Olson & Trexler
attys.

Jan. 30, 1962    C. G. HOWARD    3,019,381
RECTIFIER
Filed May 4, 1955    2 Sheets-Sheet 2
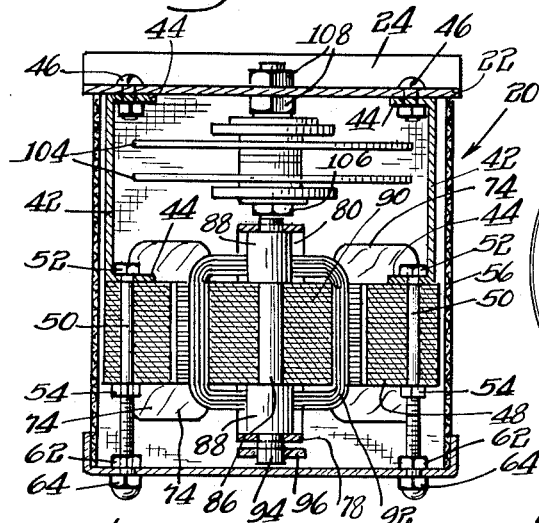
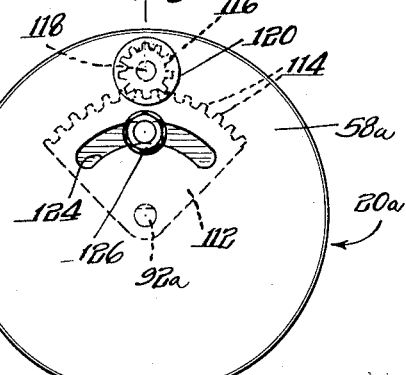
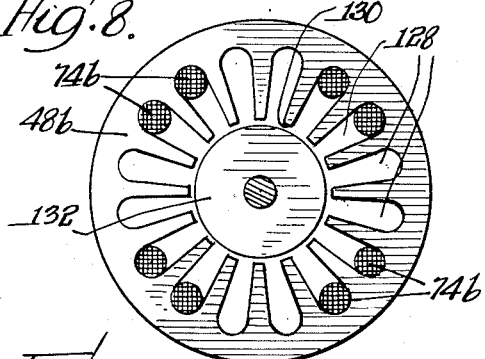
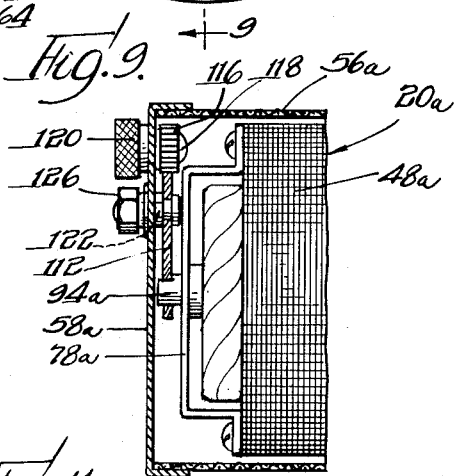
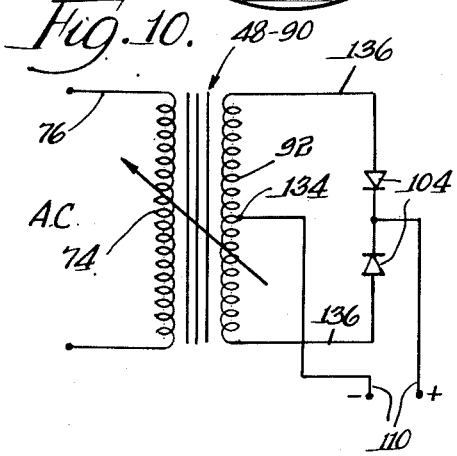
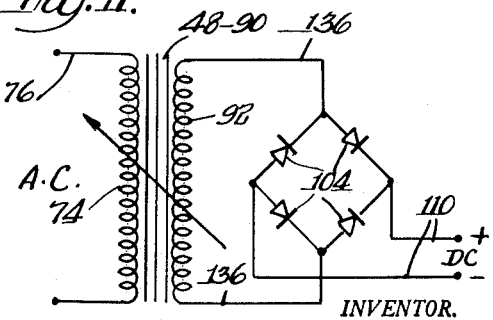
INVENTOR.
Carl G. Howard
BY:
Olson & Trexler
Attys.

United States Patent Office 3,019,381
Patented Jan. 30, 1962

3,019,381
RECTIFIER
Carl G. Howard, 261 Lakeside Place, Highland Park, Ill.
Filed May 4, 1955, Ser. No. 506,004
4 Claims. (Cl. 321—21)

This invention is concerned with a rectifier, particularly of a type having extensive use in the railroad field for charging storage batteries and supporting primary batteries.

Railroads utilize electrical potentials for a great many more or less remote functions such as the operation of signal systems and the operation of automatic gates. Needless to say, such functions must be effected regardless of weather conditions or any other considerations. Power lines cannot be relied upon to supply such potentials inasmuch as they sometimes may be down for hours at a time due to storms and the like, and inasmuch as the potentials may vary substantially from time to time in accordance with the load on the system.

Accordingly, it is the general practice to utilize either storage or primary batteries for providing the desired potentials. These batteries in many instances may be buried in pits adjacent the railroad tracks, or they may be mounted in small buildings or in signal cases mounted on power poles or the like at some distance from the ground. Storage batteries are charged from adjacent power lines by combined transformer-rectifier units so that the potentials will remain at the desired values at all times, or the transformer-rectifier units directly supply the desired potentials and are supported by primary batteries. Various requirements must be met by the transformer-rectifier units. Many of them must be capable of supplying much greater power than others. This will be obvious when it is considered that gates or signals along suburban lines with commutation service will be operated much more frequently than those in more remote areas along main line tracks. Furthermore, the motors for operating automatic gates require considerably more power than do the flashers used at some intersections, and the power requirements of signal systems will differ from both of these. Some of the power requirements are sufficiently different from others that transformer-rectifier units of different sizes must be provided. In some instances power requirements may differ slightly, but sufficiently alike that units of one size can be adjusted to fulfill the requirements. Furthermore, it will be understood that the requirements of any given installation may vary from time to time in accordance with whether or not a power line is in full time operation, and in accordance with the volume of traffic passing over the road. The capacity of the battery also will vary considerably with age. In addition, for identical installations the transformer requirements may vary somewhat in accordance with the location of the installation relative to a power station. For instance, the voltage at an installation twenty or thirty miles from a power station may drop on the line several volts below the voltage at an installation immediately adjacent a power station. Accordingly, it has been the practice to provide transformer and rectifier units which are adjustable.

Adjustment commonly has been made by varying the reluctance of a shunt path in the transformer to vary the amount of power induced in the transformer secondary. This allows adjustment to compensate both for line voltages and for different load requirements. Heretofore special transformer stampings and rather complicated and expensive adjustment devices have been required. As a result, the units heretofore produced have been relatively quite expensive.

The configuration of the prior art units with the required transformer shunt path have resulted in rather large units. The size further has been increased by the relation of the transformers and the rectifying devices. Generally the rectifiers used are of the metallic rectifier type including selenium, copper oxide, copper sulfide, germanium, silicon, or titanium plates or discs, now commonly referred to as "cells." Several cells may be stacked together as is well known in the art, and the power rating of the rectifier depends on the number of cells. Thus, a small power unit may have only one or two cells, while a large unit may have a half dozen or more rectifier cells. The physical configuration of the transformers heretofore has required that the cells be stacked to one side of the transformers with the axis of the discs parallel to the transformer laminations. Thus, the length of the stack of rectifier discs has had to be equal to the width of the transformer for proper mounting. When only a few discs are needed it is common practice to fill up the stack with washers. Thus, the size of many low power units has been as great as that of some of the higher powered units. Thus, prior art transformer and rectifier units at all times have been large, and in many instances have been unnecessarily large.

It is an object of this invention to provide a transformer-rectifier unit for charging storage batteries and for supporting primary batteries which is of simple, rugged and economical construction.

It is a further object of this invention to provide a transformer-rectifier unit of unusually small size, and particularly such a unit which occupies a minimum of wall space when mounted on a wall.

It is another object of this invention to provide a transformer-rectifier unit which readily is adjustable.

It is a further object of this invention to provide a transformer-rectifier unit wherein the transformer is of generally cylindrical configuration and the rectifier cells are stacked in coaxial alignment therewith.

Yet another object of this invention is to provide a transformer-rectifier unit utilizing standard laminations which are readily available in commerce at a low price.

It is yet another object of this invention to provide a transformer-rectifier unit wherein the transformer secondary is mounted within the primary and is rotatable relative thereto in order to vary the voltage induced in the secondary, and particularly wherein the transformer is constructed of stamped laminations of the type usually used in electric motors and readily available in commerce at a low price.

Other and further objects and advantages of the present invention will be apparent from the following description when taken in connection with the accompanying drawings, wherein:

FIG. 1 is a front elevational view of a transformer-rectifier unit constructed in accordance with the principles of my invention;

FIG. 2 is a side view thereof with certain parts broken away for clarity of illustration;

FIG. 3 is a cross sectional view taken substantially along the line 3—3 in FIG. 2;

FIG. 4 is a longitudinal sectional view taken substantially along the line 4—4 in FIG. 1;

FIG. 5 is a cross sectional view through the transformer portion of the unit taken substantially along the line 5—5 in FIG. 4;

FIG. 6 is a longitudinal sectional view taken substantially along the line 6—6 in FIG. 1 and generally at right angles to FIG. 4;

FIG. 7 is a partial front elevational view illustrating a modification of the invention;

FIG. 8 is an end view of the transformer primary laminations illustrating a modified form thereof, the view generally being similar to FIG. 5;

FIG. 9 is a fragmentary longitudinal sectional view taken substantially along the line 9—9 in FIG. 7;

FIG. 10 is a wiring diagram of the unit showing a center tap circuit; and

FIG. 11 is a modified wiring diagram showing a bridge circuit.

Referring now in greater particularity to the figures, and first to FIGS. 1–6, there is shown a transformer-rectifier unit generally identified by the numeral 20. This unit comprises a base or mounting plate 22 of generally rectangular configuration. The base plate is provided with a pair of rearwardly extending flanges 24 on its upper and lower edges, and feet 26 comprising angle members are bolted on the mounting plate near the lower edge thereof and extend forwardly in the opposite direction from the adjacent flange 24. The mounting plate is provided near its upper portion with a pair of horizontally spaced inverted keyhole slots 28 for hanging the unit on suitable studs on a wall, but the unit can be mounted instead on a shelf in which case screws or the like would be placed through the apertures in the horizontal portions of the feet 26.

A terminal block 30 is secured in horizontal position on the mounting plate near the top thereof by means of bolts 32 countersunk into the block and projecting through the back plate of the mounting or base plate 22 and having nuts 34 threaded on the projecting ends thereof. The terminal block 40 is of the material and dimensions conventionally used for devices of this type, and the material preferably is a phenolic resin. A pair of D.C. binding posts 36 is mounted toward the left end of the terminal block, while a pair of A.C. binding posts 38 is mounted near the right end of the terminal block. The binding posts comprise screws having nuts 40 threaded thereon for securing terminal wires, and it will be understood that additional wire securing nuts and lock nuts would be threaded on these screws in use for making external connections to the unit.

Two pairs of brackets 42 having right angularly disposed flanges 44 at their opposite ends are mounted on the front surface of the mounting plate 22 in opposed, confronting relation by means of nuts and bolts 46 passing through the mounting or base plate 22 and one of the flanges 44 of each bracket. At the opposite end of the brackets to the attachments to the mounting plate there is provided a stack of laminations 48. This stack of laminations is held together by bolts 50 passing through the laminations and through the adjacent flanges 44 of the brackets 42. The bolts have nuts 52 threaded on the ends thereof adjacent the flanges 44, and have nuts 54 threaded on the bolts 50 opposite to the flanges 44 and clamping against the laminations to hold them tightly together. The stacked laminations 48 comprise a portion of the transformer core as hereinafter will be brought out.

A housing or case of cylindrical configuration and made of perforated or mesh construction rests against the mounting plate and surrounds the transformer parts as is indicated at 56. The housing or case is perforated or made of mesh material for ventilation purposes, and a substantially solid flat lid or face plate 58 is placed thereover. The lid or face plate 58 can be integral with the cylindrical housing or case 56, but it is convenient to make it separate as is shown in the drawings and to have a circumferential flange 60 thereon encircle the cylindrical mesh or perforated portion 56.

The bolts or studs 50 extend through suitable apertures in the face plate or lid 58, and nuts 62 threaded on the studs beneath the face plate or lid serve to support or back up the face plate or lid. Ornamental cap nuts 64 are threaded on the outer ends of the bolts or studs 50 to hold the face plate and cylindrical case in proper position. The face plate also is provided with an arcuate slot 66 near the edge thereof for purposes hereinafter to be described, and an arbitrary scale 68 is marked on the face plate adjacent the slot.

The outline of the laminations 48 can be seen in FIGS. 3 and 5. Each lamination will be seen to be substantially circular in outline with a pair of inwardly projecting poles 70, and restricted areas 72 on the back sides of the poles for determining proper flux distribution. These laminations will be recognized immediately by those skilled in the art as being conventional stator laminations for motors having concentrated pole windings. Conventional concentrated motor pole windings 74 are placed on the poles. The windings may be connected either in series or in parallel depending upon the type of wire and number of turns to cause flux distribution across the space between the poles 70. The windings 74 are connected by leads 76 to the A.C. binding posts 38. The windings 74 serve as the primary winding of a transformer.

A bracket 78 is mounted on top of the stack of laminations 48, and a similar bracket 80 is mounted beneath the stack by means of bolts 82 passing through both brackets and through the stack of laminations and having nuts 84 threaded on the lower ends thereof. A shaft 86 is journaled in the brackets 78 and 80, and a pair of similar spacers 88 is placed on the shaft adjacent the two brackets. A stack of laminations 90 is held on the shaft between the spacers 88, and it will be apparent upon reference to FIGS. 3 and 5 that these laminations are conventional rotor laminations designed to go with the field laminations 48. More or less concentrated, but somewhat distributed rotor windings 92 are wound on the rotor laminations 90 and preferably are in the form of a single length of wire suitably connected as hereinafter will be described with reference to the schematic drawings to form the secondary of a transformer.

The upper end of the shaft 86 is provided with a non-circular section 94, such as a D-shaped section, and a lever arm 96 is fitted over this section, the lever arm having an aperture of complementary shape. The end of the shaft at 94 can be peened over slightly, or the lever arm may form a press fit on the shaft, or any other expedient may be adopted to secure the lever arm on the shaft. At the outer end of the lever arm 96 there is provided a threaded stud 98 projecting axially therefrom in the direction opposite to the shaft 92. The stud 98 projects out through the slot 66 in the face plate 58, and a preferably hexagonal nut 100 is threaded on the outer end thereof to clamp the face plate between the nut 100 and a mounting nut 102 holding the stud on the lever arm.

It will be apparent that by loosening the nut 100 slightly the lever arm can be moved back and forth in an arcuate movement to rotate the transformer secondary 92 relative to the primary 74, thereby to intercept greater or lesser amounts of flux, and thereby to vary the voltage induced in the secondary. The numerals 68 adjacent the slot are arbitrary in nature and are provided so that once a satisfactory operating position has been found for a given installation the position may be returned following a different setting, such as for increasing the rectifier output, Rectifier cells 104 are stacked together on a bolt 106 passing through the base or mounting plate 22 and secured thereto by a pair of nuts 108 on opposite sides of the mounting plate. The rectifier cells are illustrated as being two in number, and it will be understood that any number of cells will be used in accordance with the power requirements of the unit. The electrical connections for the cells are not shown except for the output leads 110 therefrom shown in FIG. 1, but it will be understood that the connections are made to the cells by any suitable means which are well known in the art. An important feature to be noted is that the cells are stacked coaxially with the transformer and the total length of the unit thus can be shortened whenever a lesser number of cells is used.

A structural modification is shown in FIGS. 7 and 9 wherein the structure generally is similar to that heretofore shown and described, and differs only in the means for rotating the transformer secondary. Several parts are omitted for clarity of illustration, and similar parts are identified by similar numerals with the addition of the suffix *a*. The major point of distinction is that in place of the lever 96 there is provided a segment 112 having gear teeth 114 thereon. The gear teeth mesh with a pinion 116 carried on a shaft 118 journaled in the face plate or lid 58a and having a knurled knob 120 on the outer end thereof. It will be apparent that rotation of the knob 120 affords a micrometer rotational adjustment through the pinion 116 and the rack 112 for precisely positioning the transformer secondary relative to the primary. In order to prevent overrunning and disengagement of the gear segment and the pinion, and also to lock the gear segment in adjusted position there is provided a threaded stud 122 on the segment projecting up through an arcuate slot 124 in the lid or face plate 58a, and a hexagonal nut or knurled knob 126 threaded on the outer end of this stud clamps against the lid or face plate. It will be appreciated that the nut or knob 126 would be backed off slightly before turning the knob 120, and that the nut 126 thereafter would be turned tightly into place.

A further structural modification is illustrated in FIG. 8, and can be utilized with either of the embodiments of the invention heretofore disclosed. This embodiment is identical in every respect with either of the embodiments heretofore shown and described except that the stator laminations 48b are of the type having a circular outline and a plurality of equally arcuately spaced slots 128 opening inwardly toward the center circular opening 130 of the laminations. This is the type of motor lamination designed for a distributed winding 74b, and it is preferred over the lamination shown in FIG. 5 for several reasons. The laminations shown in FIG. 8 often are cheaper to buy, the poles produced by the distributed winding are more sharply defined which is desirable with the rotating secondary, and no wrapping of the windings is necessary such as is necessary with the concentrated windings of FIG. 3, and such wrappings interfere with proper heat transfer and also require a greater space. The rotor and the windings thereon are illustrated somewhat schematically in FIG. 8 and are identified by the numeral 132.

The electrical connections for a center tap circuit are shown schematically in FIG. 10. The secondary winding 92 is center tapped at 134, and one of the D.C. output leads 110 is connected directly to the center tap. The opposite ends of the winding 92 are connected by wires 36 respectively to the negative sides of the rectifier cells 104, and the positive sides are connected in common to the other of the D.C. output leads 110.

A bridge circuit is schematically illustrated in FIG. 11. In this circuit the center tap 134 either is omitted or is not connected, and the wires 136 at the ends of the windings are connected to the upper and lower corners of the bridge circuit utilizing four rectifier cells 104. The other two corners of the bridge are directly connected to the D.C. output leads 110 as will be understood by those familiar with rectifiers.

The rectifier-transformer unit as heretofore shown and described is substantially smaller than conventional units now in use. It is extremely inexpensive to make due to the use of standard laminations. A unit of a given power rating can be made for substantially less than the units now in commercial production. The unit is small and rugged, and it is readily adjusted throughout a continuous range from zero volts to the maximum voltage rating determined by the windings.

The specific examples herein shown and described are to be understood as being for illustrative purposes only. Various changes in structure will no doubt occur to those skilled in the art and are to be understood as forming a part of the invention insofar as they fall within the spirit and scope of the appended claims.

The invention is hereby claimed as follows:

1. A transformer-rectifier unit comprising an elongated cylindrical housing having a sidewall and front and back end walls, a substantially cylindrical stator core coaxially mounted in said housing relatively adjacent the front end wall and snugly fitting within the sidewall, a substantially cylindrical rotor core, means including a shaft mounting said rotor core within said stator core for rotation relative thereto, means on said front end wall interconnected with said shaft for rotating said rotor core relative to said stator core and providing at said front end wall a visual indication of the relative positions of said cores, a primary coil mounted on one of said cores, a secondary coil mounted on the other of said cores and in inductive relation to the primary coil, said coils being rotatable relative to one another and each being symmetrically disposed about said shaft, relative rotation of said cores and said coils being effective to vary the voltage induced in said secondary winding, input connections to said primary winding for energizing said primary winding with alternating current, output connections from said secondary winding, metallic rectifier means mounted in said housing between the back end wall and the cores, means connecting said secondary output connections to said metallic rectifier means, and direct current output connections from said rectifier means.

2. A transformer-rectifier unit as set forth in claim 1 wherein the back end wall has mounting means, and wherein the input connections and the direct current output connections are on said back end wall.

3. A transformer-rectifier unit as set forth in claim 1 wherein the stator core and the rotor core are laminated, and wherein the laminations thereof comprise standard motor laminations.

4. A transformer-rectifier unit comprising an elongated cylindrical housing having a sidewall and front and back end walls, said back end wall being extended laterally of said sidewall and having mounting means thereon and further having alternating current input connections and direct current output connections thereon, a substantially cylindrical laminated stator core coaxially mounted in said housing relatively adjacent the front end wall and snugly fitting within the sidewall, a substantially cylindrical laminated rotor core, the laminations of both of said cores comprising standard motor laminations, means including a shaft mounting said rotor core within said stator core for rotation relative thereto, means on said front end wall interconnected with said shaft for rotating said rotor core relative to said stator core and providing at said front end wall a visual indication of the relative positions of said cores, a primary coil mounted on one of said cores and connected to said alternating current input connections, a secondary coil mounted on the other of said cores and in inductive relation to the primary coil, said coils being rotatable relative to one another and symmetrically disposed about said shaft, relative rotation of said cores and said coils being effective to vary the voltage induced in said secondary winding, disc-type rectifier means mounted in said housing between the back end wall and the cores and coaxial therewith, means connecting said secondary winding to said rectifier means, and means connecting said rectifier means to said direct current output connections.

References Cited in the file of this patent

UNITED STATES PATENTS

| | | |
|---|---|---|
| 712,639 | Berg | Nov. 4, 1902 |
| 931,115 | Conrad | Aug. 17, 1909 |
| 1,454,005 | Wenzel | May 1, 1923 |
| 1,491,370 | Alden | Apr. 22, 1924 |
| 1,771,551 | Strohschneider | July 29, 1930 |
| 1,805,154 | Webster | May 12, 1931 |
| 1,849,518 | Gay | Mar. 15, 1932 |
| 2,323,608 | Kester | July 6, 1943 |
| 2,456,978 | Medlar | Dec. 21, 1948 |
| 2,832,012 | Kleason et al. | Apr. 22, 1958 |
| 2,883,634 | Origoni et al. | Apr. 21, 1959 |